May 31, 1966  J. A. BOTT  3,253,755
LUGGAGE RACK
Filed June 22, 1964  5 Sheets-Sheet 1
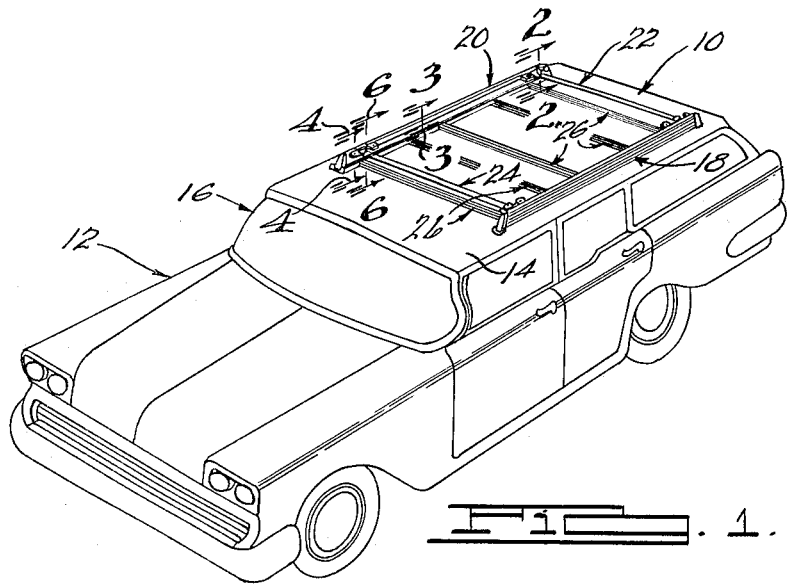
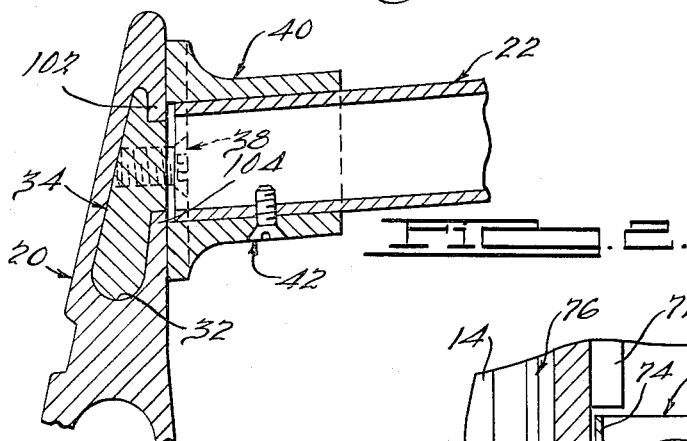
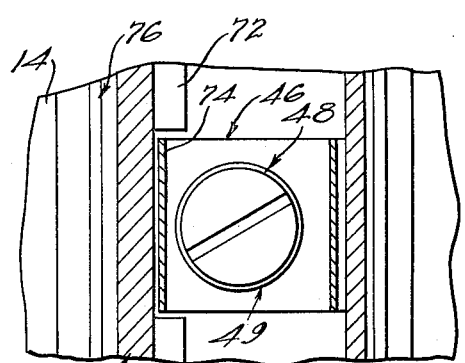
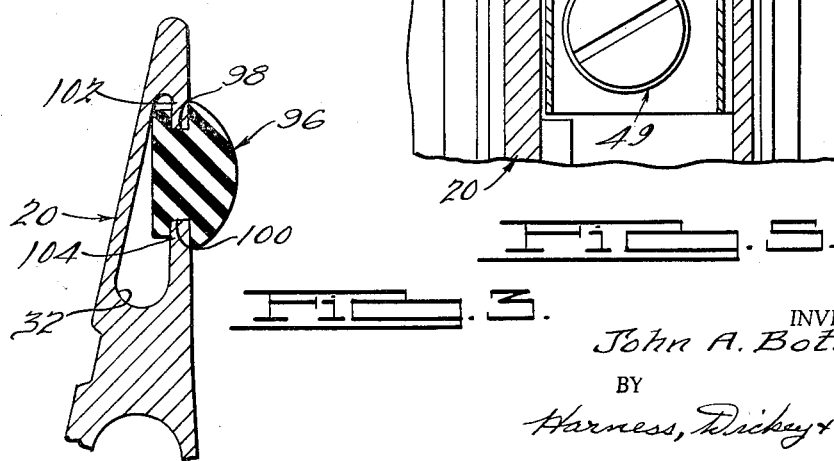
INVENTOR
John A. Bott
BY
Harness, Dickey & Pierce,
ATTORNEYS.

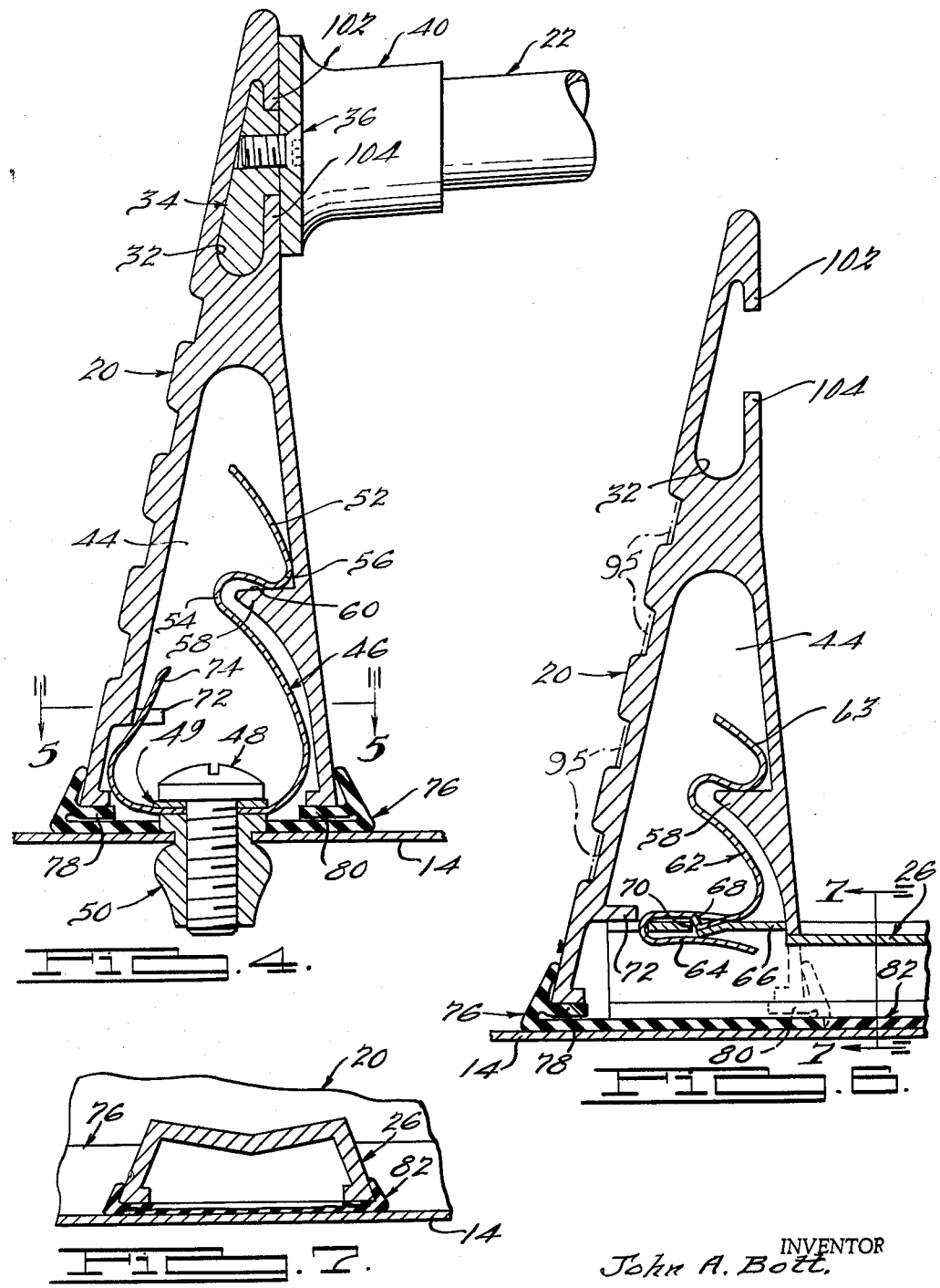

May 31, 1966
J. A. BOTT
3,253,755
LUGGAGE RACK
Filed June 22, 1964
5 Sheets-Sheet 3
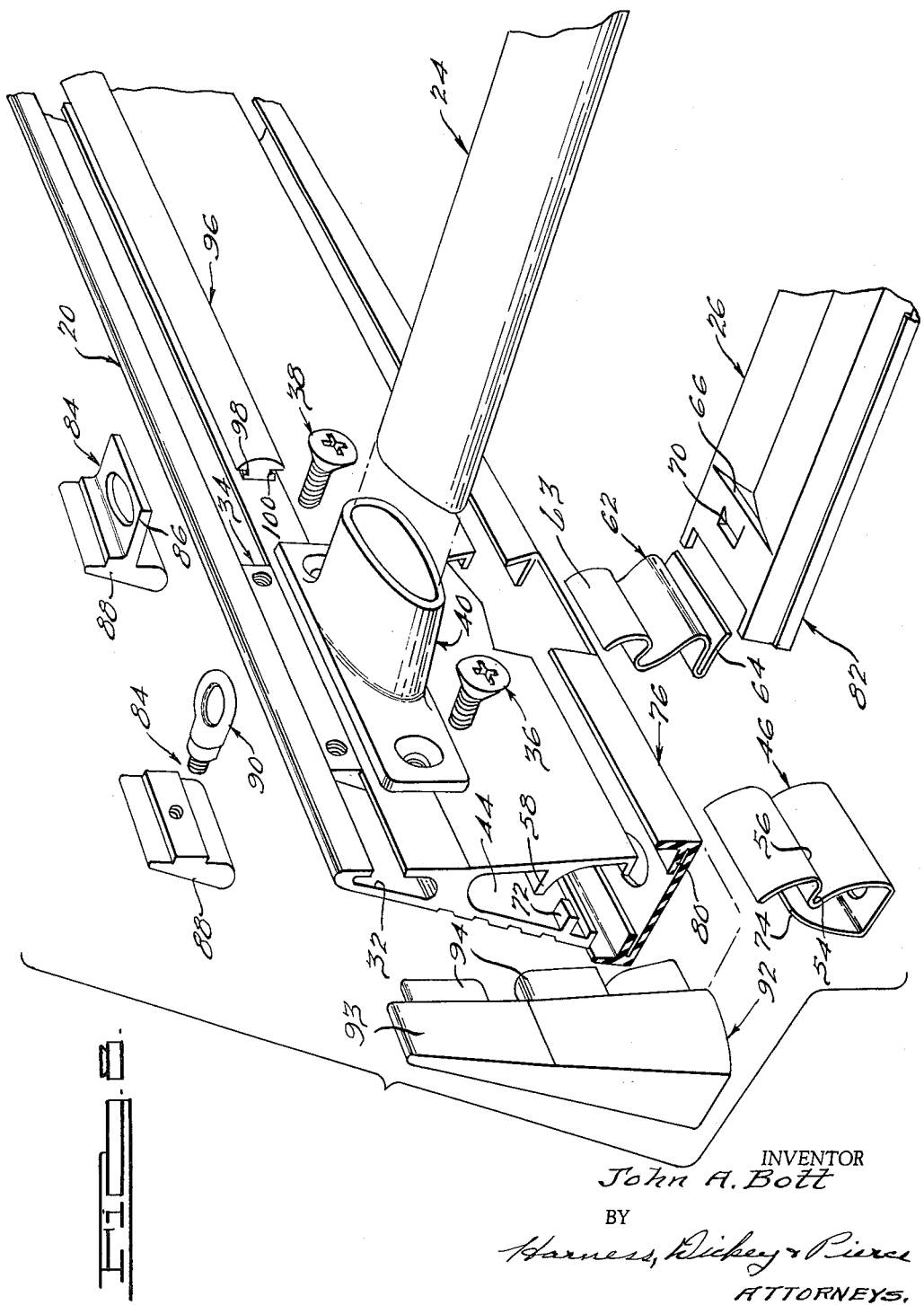
INVENTOR
John A. Bott
BY
Harness, Dickey & Pierce
ATTORNEYS.

May 31, 1966 J. A. BOTT 3,253,755
LUGGAGE RACK
Filed June 22, 1964 5 Sheets-Sheet 4
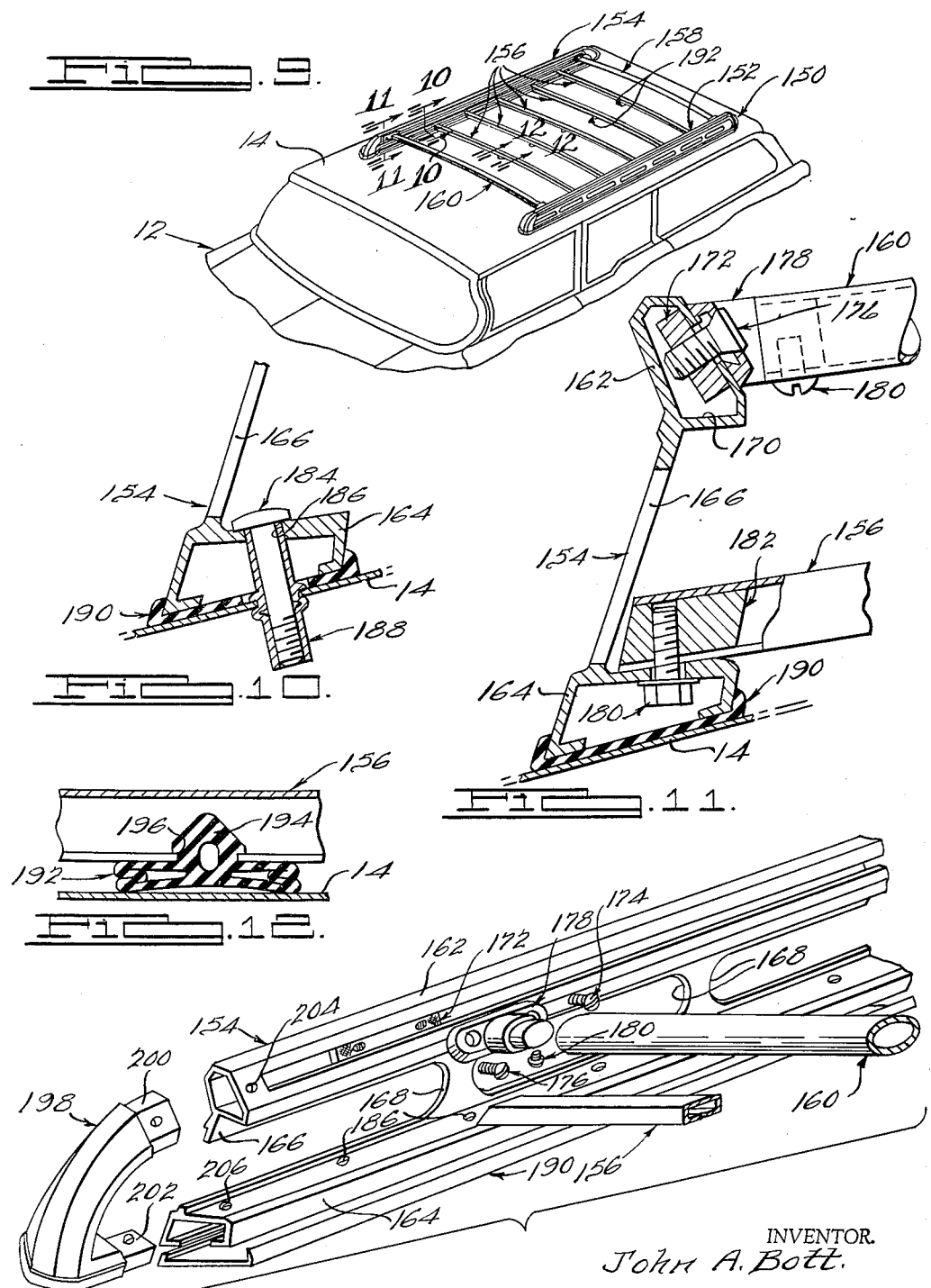
INVENTOR.
John A. Bott.
BY
Harness, Dickey & Pierce
ATTORNEYS.

May 31, 1966  J. A. BOTT  3,253,755
LUGGAGE RACK
Filed June 22, 1964  5 Sheets-Sheet 5
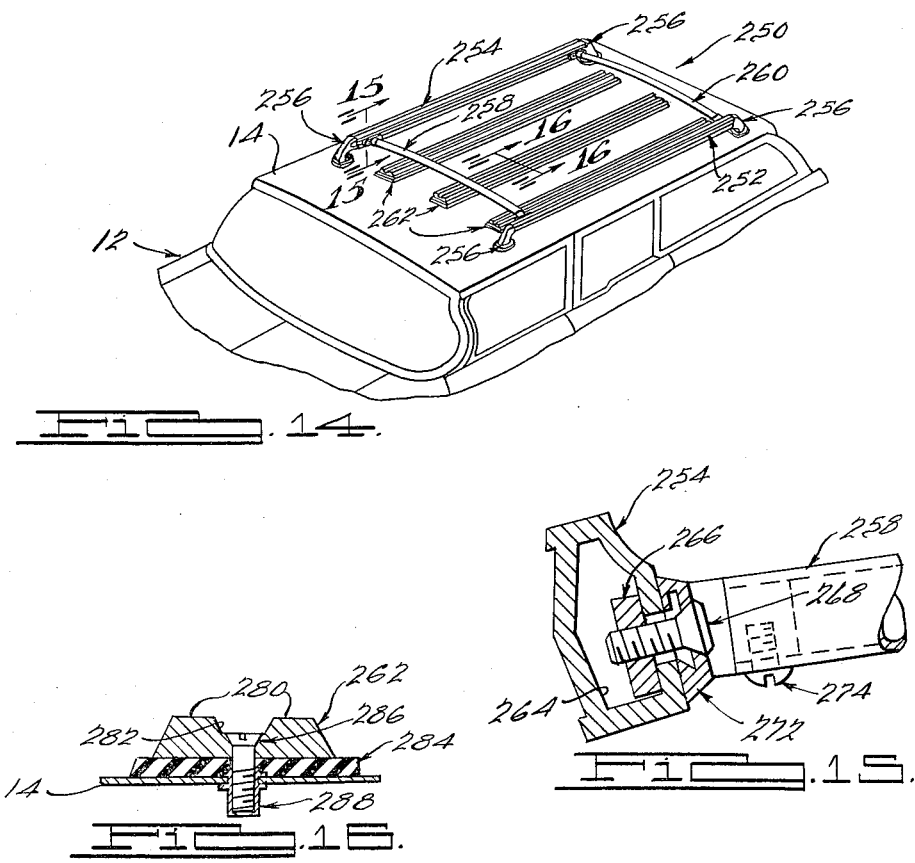
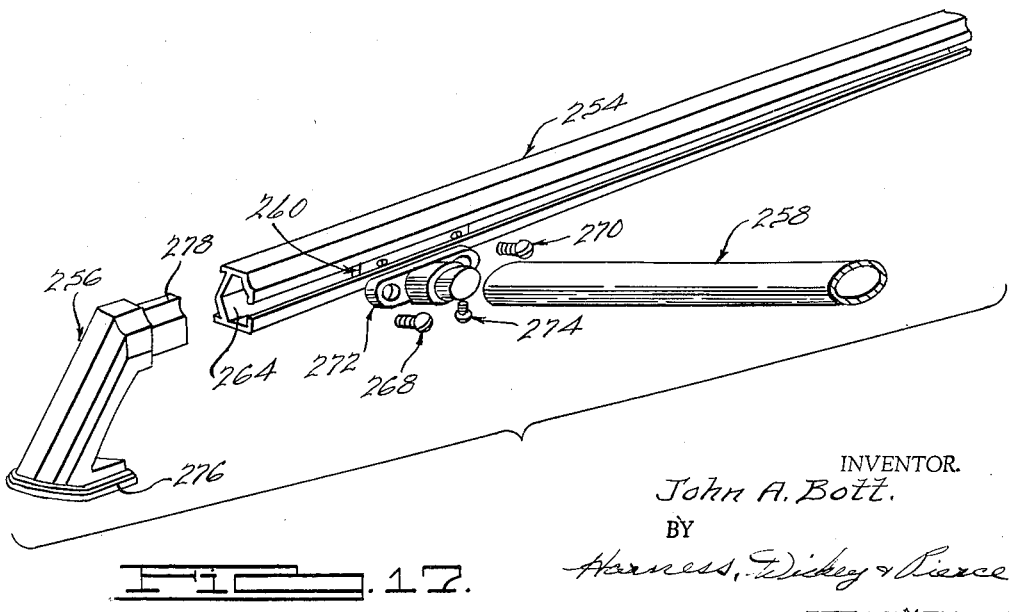
INVENTOR.
John A. Bott.
BY
Harness, Dickey & Pierce
ATTORNEYS.

United States Patent Office 3,253,755
Patented May 31, 1966

1

3,253,755
LUGGAGE RACK
John A. Bott, 931 Lake Shore Drive,
Grosse Pointe Shores, Mich.
Filed June 22, 1964, Ser. No. 376,778
15 Claims. (Cl. 224—42.1)

This invention relates generally to means for carrying luggage and the like on automotive vehicles, and more particularly, to an adjustable luggage rack adapted to be operatively mounted on the roof of an automotive vehicle.

The luggage rack of the present invention is generally characterized by a pair of spaced parallel side rails which are adapted to be rigidly secured to the roof of an automotive vehicle, and between which a plurality of transversely extending cross rails are slidably supported. Each of these cross rails is adapted to be independently adjusted longitudinally of the rack in accordance with the size and type of load being transported, thereby enabling the load to be effectively supported and secured within the rack. Another feature of the luggage rack of the present invention resides in the use of a plurality of slidably mounted rope-tie eyelets which are also adapted to be independently adjusted longitudinally of the rack so that the load being transported may be effectively secured to the rack with a minimum use of fastening ropes, straps, or similar type luggage restraining means.

It is an object of the present invention to provide a luggage rack of the above character which particularly lends itself to the use of superior metals which are light, rust-proof and pleasant in appearance.

It is another object of the present invention to provide a luggage rack of the above character which is adapted to be easily secured or mounted on an automotive vehicle.

It is still another object of the present invention to provide a luggage rack of the above character which is strong, easily assembled, reasonable in cost and which is durable in operation.

Other objects and advantages of the present invention will become apparent from the following detailed description taken in conjunction with the accompanying drawings, wherein:

FIGURE 1 is an elevated perspective view of an automotive vehicle having an exemplary embodiment of the luggage rack of the present invention in operative association;

FIGURE 2 is an enlarged fragmentary cross sectional view taken along the line 2—2 of FIGURE 1;

FIGURE 3 is an enlarged fragmentary cross sectional view taken along the line 3—3 of FIGURE 1;

FIGURE 4 is an enlarged fragmentary cross sectional view taken along the line 4—4 of FIGURE 1;

FIGURE 5 is a fragmentary cross sectional view taken along the line 5—5 of FIGURE 4;

FIGURE 6 is an enlarged fragmentary cross sectional view taken along the line 6—6 of FIGURE 1;

FIGURE 7 is a fragmentary cross sectional view taken along the line 7—7 of FIGURE 6;

FIGURE 8 is an enlarged exploded assembly view of a portion of a luggage rack illustrated in FIGURE 1;

FIGURE 9 is an elevated perspective view of an automotive vehicle having a luggage rack in accordance with an alternate construction of the present invention in operative association;

FIGURE 10 is an enlarged fragmentary cross sectional view taken along the line 10—10 of FIGURE 9;

FIGURE 11 is an enlarged cross sectional view taken along the line 11—11 of FIGURE 9;

FIGURE 12 is an enlarged cross sectional view taken along the line 12—12 of FIGURE 9;

FIGURE 13 is an enlarged exploded assembly view of a portion of the luggage rack illustrated in FIGURE 9;

2

FIGURE 14 is an elevated perspective view of an automotive vehicle having a luggage rack in accordance with still another construction of the present invention in operative association;

FIGURE 15 is an enlarged cross sectional view taken along the line 15—15 of FIGURE 14;

FIGURE 16 is an enlarged fragmentary cross sectional view taken along the line 16—16 of FIGURE 14, and FIGURE 17 is an enlarged exploded assembly view of a portion of the luggage rack illustrated in FIGURE 14.

Referring now to FIGURE 1 of the drawings, a luggage rack 10, in accordance with an exemplary embodiment of the present invention, is shown in operative association with an automotive vehicle 12 having a substantially flat roof portion 14 extending rearwardly of a windshield 16. The luggage rack 10 includes a pair of identical longitudinally extending side rails 18 and 20 mounted in a spaced parallel relationship on the vehicle's roof portion 14. A pair of longitudinally spaced, tubular cross rails 22 and 24, and a plurality of luggage supporting base members, generally designated 26, extend transversely between the side rails 18 and 20 and are adapted to be operatively secured thereto, in a manner hereinafter to be described.

As best seen in FIGURES 2 and 4, the inboard sides of the upper ends of the side rails 18 and 20 are formed with a longitudinally extending slideway or channel 32. A pair of identical slide members, generally designated 34, of a complementary shape with respect to the channels 32, are slidably mounted within the channel 32 of each of the side rails 18 and 20. The slide members 34 are each adapted to be rigidly secured by a pair of machine screws 36 and 38 (see FIGURE 8), to one of a plurality of flanged collar brackets 40 that are secured, as by locking screws 42, one on each end of each of the transversely extending cross rails 22 and 24. Accordingly, it will be seen that each of the cross rails 22 and 24 is adapted to be independently moved or adjusted longitudinally of the side rails 18 and 20 in accordance with the size and type of load being transported such that optimum use may be made of the cross rails 22 and 24 in securing and supporting the load within the rack 10. It may be noted that when the cross rails 22 and 24 have been moved or adjusted to a predetermined longitudinal position, the screws 36 and 38 may be tightened, thereby clamping a portion of the side rails' inboard sides interjacent the collar brackets 40 and the slide members 34 and thus rigidly securing the opposite ends of the cross rails 22 and 24 to the side rails 18 and 20.

As best seen in FIGURE 4, each of the side rails 18 and 20 is formed with a longitudinal cavity 44 which extends upwardly from the lower ends of the rails 18, 20 interjacent the web or central portions thereof, which cavities are adapted to receive a plurality of longitudinally spaced spring clip members, generally designated 46, which function to rigidly secure the said rails 18 and 20 to the roof portion 14 of the automotive vehicle 12. Each of the spring clip members 46 is secured to the roof portion 14 by a conventional screw 48, washer 49 and a suitable nut such as the riv-nut 50, and is formed with an arcuately configured upper end section 52 that defines an indented groove portion 54 and a convex lip portion 56. In order to operatively secure the luggage rack 10 to the vehicle 12, the side rails 18 and 20 are forced downwardly onto the spring clip members 46 which are arranged in two spaced parallel rows on the roof portion 14 of the vehicle 12, whereby the lip portions 56 of the clip members 46 are resiliently biased laterally outward by a longitudinally extending shoulder portion 58 that is formed on the inboard side of the cavity 44 of each of the side rails 18 and 20. As the rails 18 and 20 are biased further downward, the lip portions 56 of the clip members 46 snap over the upper edges of the shoulder portions 58 which are defined by generally horizontal surfaces 60, whereby the spring clip members 46 exert a resiliently downwardly directed force on the shoulder portions 58 and thus rigidly and lockingly secure the rails 18 and 20 to the vehicle's roof portion 14.

Referring now to FIGURES 6 and 7, the longitudinally spaced and transversely extending luggage supporting base members 26 are each generally M-shaped in transverse cross section and are operatively supported between the side rails 18 and 20 in a substantially contiguous relationship with respect to vehicle's roof portion 14. The base members 26 may be secured to the side rails 18 and 20 in any one of a number of suitable manners ranging from press fitting the opposite ends of the members 26 within suitable openings in the side rails 18 and 20, to using a plurality of angle connecting members and mechanically joining the members 26 to the side rails 18 and 20 by suitable bolts or rivets. The method illustrated herein of joining the members 26 to the side rails 18 and 20 utilizes a plurality of spring clip members, one of which is illustrated in FIGURE 6 and is generally designated by the numeral 62.

The spring clip member 62 is formed with an arcuate upper end portion 63 which is substantially identical in shape and is adapted to function in substantially the same manner as the upper end sections 52 of the aforediscussed spring clip members 46; however, the lower end of the member 62 is substantially different from those of the members 46 and is formed with a generally horizontally extending flange section 64 that is adapted to lockingly engage a raised web portion 66 formed on the end of the base member 26, as seen in FIGURE 6. A detent portion 68 is formed in the lower end of the member 62 and upon assembly of the rack 10 is adapted to engage a complementary shaped notch 70 in the web portion 66, thereby lockingly securing the base member 26 to the associated side rail 18 or 20 to preclude any linear or axial movement between these numbers. As seen in FIGURES 4 and 6, a longitudinally extending shoulder portion 72 is formed on the outboard side of the cavities 44 in the side rails 18 and 20. The shoulder portions 72 are adapted to overlie the outboard ends of the base members 26 and are formed with a plurality of longitudinally spaced notches which are adapted to receive the upwardly extending tail portions 74 that are formed on the outboard sides of the clips 46.

A pair of longitudinally extending sealing or gasket members 76 are disposed one interjacent the lower ends of each of the side rails 18 and 20 and the upper surface of the vehicle's roof portion 14, as seen in FIGURES 4 and 8. The gasket members 76 are preferably constructed of a resilient and deformable material such as molded rubber or the like, and each comprises a pair of inwardly extending deformable shoulder portions 78 and 80 upon which the outboard and inboard sides, respectively, of the side rails 18 and 20 are adapted to be seated, whereby a substantially moisture-proof seal is provided between the vehicle's roof portion 14 and the interior of the cavities 44 of the side rails 18 and 20.

In a similar manner, a plurality of elongated sealing or gasket members 82 are disposed one interjacent the lower side of each of the base members 26 and the upper surface of the vehicle's roof portion 14, as seen in FIGURES 6 and 8. The gasket members 82 function in identical manner as the aforediscussed members 76 in providing a moisture-proof seal between the base members 26 and the upper surface of the roof portion 14; however, the gasket members 82 also function to compensate for any curvature in the roof portion 14 such that a contiguous union is provided between each of the base members 26 and the roof portion 14.

As illustrated in FIGURE 8, a plurality of rope-tie eyelets, two different embodiments of which are illustrated herein and are designated by the numeral 84, are adapted to be slidably disposed within the channels 32 of the side rails 18 and 20 to facilitate securing luggage and the like within the rack 10. One embodiment of the eyelet 84 is shown having an apertured shoulder section 86 extending outwardly from a slide portion 88 which is identical in cross section to the aforediscussed slide members 34 and which is adapted to slide longitudinally within the channel 32 of the side rails 18 and/or 20. The second embodiment of the eyelet 84 is shown having a screw eye 90 which is adapted to be threadably secured to the slide portion 88. The eyelets 84 are adapted to be longitudinally oriented along the side rails 18 and 20 so that the load being transported may be effected secured within the luggage rack 10 with a minimum use of fastening ropes, straps, or similar type load restraining means.

To enhance the appearance of the rack 10, and to prevent moisture, road dirt and the like from accumulating within the cavities 44 of the side rails 18 and 20, the opposite ends of the rails 18 and 20 may be closed by suitable end cap members such as the member 92 illustrated in FIGURE 8. The member 92 is formed with an outer portion 93 which is of the same general conformation as the side rails 18 and 20, and is also formed with an inner section 94 which is of a complementary shape with respect to the longitudinally extending channels 32 and cavities 44 of the side rails 18 and 20. The end cap 92 is adapted to be secured to one end of one of the side rail 18 or 20 by press fitting the inner end section 94 thereof within the ends of the channel 32 and cavity 44. To further enhance the appearance of the rack 10, the outboard sides of the side rails 18 and 20 may be formed with a plurality of vertically spaced and longitudinally extending lands and grooves, which grooves may, if desired, be painted any suitable color, as seen at 95 in FIGURE 6.

Referring again to FIGURE 3, a pair of elongated sealing strips 96 having longitudinally extending slots 98 and 100 on the upper and lower sides thereof, are adapted to be disposed on the inboard side of the channels 32 of the side rails 18 and 20 interjacent the slide members 34 and the eyelets 84. The sealing strips 96 are adapted to be slidably inserted into the channels 32, whereby the slots 98 and 100 slidably receive vertically spaced side portions 102 and 104 which are formed on the inboard sides of the side rails 18 and 20. The sealing strips 96 are adapted to prevent moisture, road dirt and the like from accumulating within the channels 32, and further function as cushioning means between the side rails 18 and 20 and the luggage being transported within the rack 10. The sealing strips 96, together with the aforediscussed side rail end cap 92, may be constructed of any suitable weather-resistant material that is easily formed, such as molded plastic, rubber or the like.

Referring now to FIGURES 9 through 13, a ski rack 150, in accordance with an alternate construction of the present invention, is shown operatively mounted on the roof portion 14 of the automotive vehicle 12. The rack 150 comprises a pair of longitudinally extending, spaced parallel side rails 152 and 154 between which are supported a plurality of transversely extending base members 156 and a pair of slidably supported cross rails 158 and 160. As best seen in FIGURE 11, each of the side rails 152 and 154 comprise longitudinally extending hollow upper channel sections 162 and generally U-shaped base sections 164 which are connected by upwardly extending web sections 166 that are formed of a plurality of elongated openings 168. The channel sections 162 of each of the side rails 152 and 154 defines a longitudinally extending channel 170 within which a pair of slide members 172 are slidably disposed, one of which is seen in FIGURES 11 and 13.

As in the aforediscussed luggage rack 10, the slide members 172 are adapted to be secured as by screws 174 and 176 (see FIG. 13) to one of a plurality of flanged collar members 178 that are secured, as by locking screws 180, one on each end of each of the cross rails 158 and 160. Accordingly, the cross rails 158 and 160 may be independently adjusted longitudinally of the side rails 152 and 154 in accordance with the size and type of load being transported within the rack 150, as previously described.

The plurality of transversely extending base members 156, which are preferably C-shaped in transverse cross-section, are secured to the side rails 152 and 154 by a plurality of bolts, generally designated 180, which extend upwardly from the top of the said rails' base portions 164 and are threaded within suitable fastening members 182 that are disposed in the outboard ends of the base members 156, as seen in FIGURE 11.

The side rails 152 and 154 are secured to the roof portion 14 of the automotive vehicle 12 by a plurality of bolts 184 which extend downwardly through suitable apertures 186 in the top of the side rails' base sections 164 and are threadably secured to the roof portion 14 by suitable riv-nuts 188, as seen in FIGURE 10. A resilient deformable sealing or gasket member 190 extends longitudinally between the lower ends of the side rails' base sections 164 and the vehicle's roof portion 14. The gasket members 190 function identically to the aforediscussed gasket members 76 of the luggage rack 10 and are secured to the roof portion 14 by being compressed between the side rails' base sections 164 and the roof portion 14 upon mounting the rack 150 on the vehicle 12.

As seen in FIGURES 9 and 12, a plurality of annular resilient support pads 192 are disposed one subjacent a medial portion of each of the base members 156. Each of the support pads 192 is formed with a grommet-like upper end section 194 which is adapted to project upwardly through a suitable aperture 196 in the lower side of one of the base members 156, thereby securing the pad 192 to the member 156. The pads 192 are preferably constructed of molded rubber or the like and act as support means to prevent the base members 156 from being biased or deformed into engagement with the roof portion 14 when relatively heavy loads are being transported within the rack 150.

As seen in FIGURE 13, the opposite ends of the side rails 152 and 154 are provided with end cap members 198 which function in essentially the same manner as the members 92 in the luggage rack 10. The end cap members 198 are formed with upper and lower projecting sections 200 and 202 which are adapted to be inserted within the ends of the channel sections 162 and base sections 164, respectively, of the side rails 154 and 156, whereby suitable screws (not shown) may be threaded within suitable apertures 204 and 206 to secure the end members to the ends of the side rails 152 and 154.

Referring now to FIGURES 14 through 17, a luggage rack 250, in accordance with still another construction of the present invention, is shown operatively mounted on the roof portion 14 of the automotive vehicle 12. The luggage rack 250 comprises a pair of longitudinally extending side rails 252 and 254 which are supported at their opposite ends by one of a plurality of support stanchions, generally designated 256. The luggage rack 250 further comprises a pair of transversely extending and longitudinally slidable cross rails 258 and 260 and a plurality of longitudinally extending luggage supporting base members, generally designated 262.

As seen in FIGURE 15, the side rails 252, and 254 consist of elongated tubular members and each defines a central longitudinally extending channel 264. Disposed in the channels 264 of each of the side rails 252 and 254 are a pair of slide members, generally designated 266, which are longitudinally slidable within the channels 264. As in each of the aforediscussed constructions of the luggage rack of the present invention, the slide members 266 are each adapted to be secured as by screws 268 and 270 (see FIGURE 17) to one of a plurality of flanged collar members 270 which are secured, as by locking screws 274, one on each end of each of the cross rails 258 and 260. Accordingly, the cross rails 258 and 260 are adapted to be independently adjusted longitudinally of the side rails 252 and 254 in a manner identical to the way the cross rails 22, 24 and 158, 160 are slidably adjustable in the aforediscussed luggage rack constructions 10 and 150, respectively.

As previously mentioned, the side rails 252 and 254 are supported on the roof portion 14 of the automotive vehicle 12 by a plurality of stanchions 256. Each of the stanchions 256 comprises a base section 276 which is adapted to be secured to the roof portion 14 by suitable screws (not shown). The stanchions 256 further comprise upper end sections 278 that are of a complementary shape with respect to the channels 264 and are thereby adapted to be inserted into the ends of their associated side rail 252 or 254. Suitable locking screws (not shown) may be used to secure the upper end sections 278 of the stanchions 256 within the ends of the side rails 252 and 254.

As seen in FIGURE 16, the base members 262 extend parallel to the side rails 252 and 254 and each defines an upper luggage supporting surface 280 within which is formed a longitudinally extending central groove 282. A resilient gasket or sealing member 284, which functions in an identical manner as the aforediscussed members 76 and 190, is disposed between the lower side of each of the base members 262 and the upper surface of the vehicle's roof portion 14. The base members 262 and sealing members 284 are secured to the upper surface of the roof portion 14 by a plurality of screws 286 which extend downwardly from the grooves 282 of the base members 262 and are threadably secured to suitable riv-nuts 288, as seen in FIGURE 16.

In each of the luggage rack constructions described therein, the side rails, base members and cross rails are preferably fabricated of extruded aluminum or a similar light-weight, non-corrosive material such as stainless steel, or the like. Such a construction not only requires relatively low cost tooling but also minimizes the structurally accrued weight added to the automotive vehicle. Moreover, this construction provides a corrosion resistant structure which is extremely pleasant in appearance.

While it will be apparent that the embodiments of the present invention herein illustrated are well calculated to fulfill the objects above stated, it will be appreciated that the invention is susceptible to modification, variation and change without departing from the proper scope or fair meaning of the subjoined claims.

What is claimed is:

1. In a luggage rack adapted to be mounted on a generally horizontally extending surface portion of an automotive vehicle, a pair of spaced parallel load constraining side rails extending longitudinally of the vehicle and fixedly secured to said surface portion thereof, each of said side rails having an elongated channel formed therein and extending longitudinally between the opposite ends thereof, sliding means longitudinally slidable within said channel of each of said side rails, a cross rail extending transversely between said side rails, said cross rail having means on the opposite ends thereof connected to said sliding means for securing said one cross rail to said side rails, and a pair of end members each positioned at one end of each of said side rails, said end members having portions received within the adjacent ends of said channels and being adapted to at least partially support said side rails above said vehicle surface.

2. In a luggage rack adapted to be mounted on a generally horizontally extending surface portion of an automotive vehicle, a pair of spaced parallel load constraining side rails extending longitudinally of the vehicle and fixedly secured to said surface portion thereof, each of said side rails having an elongated channel formed therein and extending longitudinally between the opposite ends thereof, sliding means longitudinally slidable within said channel of each of said side rails, a cross rail extending transversely between said side rails, said cross rail being longitudinally movable substantially along the entire lengths of said side rails, whereby to vary the area between said side rails within which articles supported upon said surface portion of the vehicle are adapted to be supported, said cross rail having means on the opposite ends thereof connected to said sliding means for securing said one cross rail to said side rails, and a pair of end members each positioned at one end of each of said side rails, said end members having portions received within the adjacent ends of said channels and being adapted to at least partially support said side rails above said vehicle surface.

3. In a luggage rack adapted to be mounted on a generally horizontally extending surface portion of an automotive vehicle, a pair of spaced parallel side rails extending longitudinally of the vehicle and fixedly secured to said surface portion thereof, each of said side rails having an elongated channel formed therein and extending longitudinally between the opposite ends thereof, sliding means longitudinally slidable within said channel of each of said side rails, a cross rail extending transversely between said side rails, said cross rail having means on the opposite ends thereof connected to said sliding means for securing said one cross rail to said side rails, mounting bracket means on the opposite ends of said cross rail and manually adjustable means connecting said bracket means to said sliding means for fixedly securing said cross rail at a preselected position along said side rails, and a pair of end members each positioned at one end of each of said side rails, said end members having portions received within the adjacent ends of said channels and being adapted to at least partially support said side rails above said vehicle surface.

4. In a luggage rack adapted to be mounted on a generally horizontally extending surface portion of an automotive vehicle, a pair of spaced parallel load constraining side rails extending longitudinally of the vehicle and fixedly secured to said surface portion thereof, each of said side rails having an elongated channel formed therein and extending longitudinally between the opposite ends thereof, said channel defining spaced upper and lower flange portions coextensive thereof, sliding means longitudinally slidable within said channel of each of said side rails, a cross rail extending transversely between said side rails, said cross rail having means on the opposite ends thereof connected to said sliding means for securing said one cross rail to said side rails, said last mentioned means cooperating with said sliding means for clampingly engaging said flange portions, whereby to secure said cross rail at a preselected longitudinal position along said side rails, and a pair of end members each positioned at one end of each of said side rails, said end members having portions received within the adjacent ends of said channels and being adapted to at least partially support said side rails above said vehicle surface.

5. In a luggage rack adapted to be mounted on a generally horizontally extending surface portion of an automotive vehicle, a pair of spaced parallel load constraining side rails extending longitudinally of the vehicle and fixedly secured to said surface portion thereof, each of said side rails having an elongated channel formed therein and extending longitudinally between the opposite ends thereof, said side rails each being of a one-piece extruded metal construction and said channels facing toward one another, sliding means longitudinally slidable within said channel of each of said side rails, a cross rail extending transversely between said side rails, said cross rail having means on the opposite ends thereof connected to said sliding means for securing said one cross rail to said side rails, and a pair of end members each positioned at one end of each of said side rails, said end members having portions received within the adjacent ends of said channels and being adapted to at least partially support said side rails above said vehicle surface.

6. In a luggage rack adapted to be mounted on a generally horizontally extending surface portion of an automotive vehicle, a pair of spaced parallel load constraining side rails extending longitudinally of the vehicle and fixedly secured to said surface portion thereof, each of said side rails having an elongated channel formed therein and extending longitudinally between the opposite ends thereof, sliding means longitudinally slidable within said channel of each of said side rails, a cross rail extending transversely between said side rails, said cross rail having means on the opposite ends thereof connected to said sliding means for securing said one cross rail to said side rails, and a pair of end members each positioned at one end of each of said side rails, said end members having portions received within the adjacent ends of said channels and being adapted to at least partially support said side rails above said vehicle surface, the upper ends of said end members being of substantially the same configuration in transverse section as said side rails such that a substantially smooth surface is provided at the juncture of said end members and said side rails when said portions of said end members are received within the ends of said channels.

7. In a luggage rack adapted to be mounted on a generally horizontally extending surface portion of an automotive vehicle, a pair of spaced parallel load constraining side rails extending longitudinally of the vehicle and fixedly secured to said surface portion thereof, each of said side rails having an elongated channel formed therein and extending longitudinally between the opposite ends thereof, sliding means longitudinally slidable within said channel of each of said side rails, a cross rail extending transversely between said side rails, said cross rail having means on the opposite ends thereof connected to said sliding means for securing said one cross rail to said side rails, and a pair of end members each positioned at one end of each of said side rails, said end members having portions received within the adjacent ends of said channels and being adapted to at least partially support said side rails above said vehicle surface, said channels and said portions of said end members being noncircular in transverse section such that said side rails are nonrotatably supported upon said end members.

8. In a luggage rack adapted to be mounted on a generally horizontally extending surface portion of an automotive vehicle, a pair of spaced parallel load constraining side rails extending longitudinally of the vehicle and fixedly secured to said surface portion thereof, each of said side rails having an elongated channel formed therein and extending longitudinally between the opposite ends thereof, sliding means longitudinally slidable within said channel of each of said side rails, a cross rail extending transversely between said side rails, said cross rail having means on the opposite ends thereof connected to said sliding means for securing said one cross rail to said side rails, a pair of end members each positioned at one end of each of said side rails, said end members having portions received within the adjacent ends of said channels and being adapted to at least partially support said side rails above said vehicle surface, and eyelet means longitudinally movable along said side rails and adapted to receive rope-ties to facilitate securing articles within the luggage rack.

9. In a luggage rack adapted to be mounted on a generally horizontally extending surface portion of an automotive vehicle, a pair of spaced parallel load constraining side rails extending longitudinally of the vehicle and fixedly secured to said surface portion thereof, each of said side rails having an elongated channel formed therein and extending longitudinally between the opposite ends thereof, sliding means longitudinally slidable within said channel of each of said side rails, a cross rail extending transversely between said side rails, said cross rail having means on the opposite ends thereof connected to said sliding means for securing said one cross rail to said side rails, a pair of end members each positioned at one end of each of said side rails, said end members having portions received within the adjacent ends of said channels and being adapted to at least partially support said side rails above said vehicle surface, and at least one eyelet member on one of said side rails and comprising a sliding portion disposed within the channel thereof, whereby said eyelet member may be longitudinally adjusted along said one side rail.

10. In a luggage rack adapted to be mounted on a generally horizontally extending surface portion of an automotive vehicle, a pair of spaced parallel side rails extending longitudinally of the vehicle and fixedly secured to said surface portion thereof, each of said side rails being of a one-piece extruded metal construction and comprising an upper portion, a lower base portion and a web portion extending between and interconnecting said upper and said base portions, the upper portion of said side rails forming a longitudinally extending slideway, and a pair of cross rails extending transversely between said side rails and connected at their opposite ends to said upper portions thereof, at least one of said cross rails having its ends within the slideways and movable longitudinally thereof and also movable at least partially along the extent of the web portion, said side rails and said cross rails defining a generally rectangular area within which articles supported upon said surface portion of the vehicle are adapted to be confined.

11. In a luggage rack adapted to be mounted on a generally horizontally extending surface portion of an automotive vehicle, a pair of spaced parallel side rails extending longitudinally of the vehicle and fixedly secured to said surface portion thereof, each of said side rails being of a one-piece extruded metal construction and comprising an upper portion, a lower base portion and a web portion extending between and interconnecting said upper and said base portions, the upper portion of said side rails forming a longitudinally extending slideway, and said web portions of said side rails being formed with elongated longitudinally spaced openings which define vertical column portions extending between said base portions and said upper portions, a pair of cross rails extending transversely between said side rails and connected at their opposite ends to said upper portions thereof, at least one of said cross rails having its ends within the slideways and movable longitudinally thereof and also movable at least partially along the extent of the web portion, said side rails and said cross rails defining a generally rectangular area within which articles supported upon said surface portion of the vehicle are adapted to be confined.

12. In a luggage rack adapted to be mounted on a generally horizontally extending surface portion of an automotive vehicle, a pair of spaced parallel side rails extending longitudinally of the vehicle and fixedly secured to said surface portion thereof, each of said side rails being of a one-piece extruded metal construction and comprising an upper portion, a lower base portion and a web portion extending between and interconnecting said upper and said base portions, the upper portion of said side rails forming a longitudinally extending slideway, a pair of cross rails extending transversely between said side rails and connected at their opposite ends to said upper portions thereof, at least one of said cross rails having its ends within the slideways and movable longitudinally thereof and also movable at least partially along the extent of the web portion, said side rails and said cross rails defining a generally rectangular area within which articles supported upon said surface portion of the vehicle are adapted to be confined, and at least one luggage supporting rail extending transversely between said side rails and supported at the opposite ends thereof upon said base portions of said side rails.

13. In a luggage rack adapted to be mounted on a generally horizontally extending surface portion of an automotive vehicle, a pair of spaced parallel side rails extending longitudinally of the vehicle and fixedly secured to said surface portion thereof, each of said side rails being of a one-piece extruded metal construction and comprising an upper portion, a lower base portion and a web portion extending between and interconnecting said upper and said base portions, the upper portion of said side rails forming a longitudinally extending slideway, a pair of cross rails extending transversely between said side rails and connected at their opposite ends to said upper portions thereof, at least one of said cross rails having its ends within the slideways and movable longitudinally thereof and also movable at least partially along the extent of the web portion, said side rails and said cross rails defining a generally rectangular area within which articles supported upon said surface portion of the vehicle are adapted to be confined, and fastener means extending between said lower base portions of said side rails and said portion for securing said side rails to the vehicle.

14. In a luggage rack adapted to be mounted on a generally horizontally extending surface portion of an automotive vehicle, a pair of spaced parallel side rails extending longitudinally of the vehicle and fixedly secured to said surface portion thereof, each of said side rails being of a one-piece extruded metal construction and comprising an upper portion, a lower base portion and a web portion extending between and interconnecting said upper and said base portions, the upper portion of said side rails forming a longitudinally extending slideway, a pair of cross rails extending transversely between said side rails and connected at their opposite ends to said upper portions thereof, at least one of said cross rails having its ends within the slideways and movable longitudinally thereof and also movable at least partially along the extent of the web portion, said side rails and said cross rails defining a generally rectangular area within which articles supported upon said surface portion of the vehicle are adapted to be confined, and end cap means disposed at each end of each of said side rails and comprising first and second portions insertable within said upper and lower portions of said side rails.

15. In a luggage rack adapted to be mounted on a generally horizontally extending surface portion of an automotive vehicle, a pair of spaced parallel side rails extending longitudinally of the vehicle and fixedly secured to said surface portion thereof, each of said side rails being of a one-piece extruded metal construction and comprising an upper portion, a lower base portion and a web extending between and interconnecting said upper and said base portions, the upper portion of said side rails forming a longitudinally extending slideway, each of said slideways defining a longitudinally extending channel, sliding means longitudinally slidable within said channels, a pair of cross rails extending transversely between said side rails and connected at their opposite ends to said upper portions thereof, at least one of said cross rails having its ends secured to said sliding means movable longitudinally at least partially along the extent of the web portion, said side rails and said cross rails defining a generally rectangular area within which articles supported upon said surface portion of the vehicle are adapted to be confined, and a pair of end members positioned one at one end of each of said side rails and having portions received within said ends of said side rails.

References Cited by the Examiner

UNITED STATES PATENTS

| | | | |
|---|---|---|---|
| 2,155,872 | 4/1939 | Reifer et al. | 105—369 |
| 2,165,652 | 7/1939 | Reifer et al. | 105—369 |
| 2,345,650 | 4/1944 | Attwood | 105—369 |
| 2,540,207 | 2/1951 | Mangels | 105—369 |
| 2,827,958 | 3/1958 | Lee | 105—369 |
| 2,919,841 | 1/1960 | Helm | 224—42.1 |
| 3,223,301 | 12/1965 | Helm | 224—42.1 |

FOREIGN PATENTS

| | | |
|---|---|---|
| 886,287 | 4/1941 | France. |
| 941,810 | 10/1948 | France. |
| 1,016,168 | 10/1952 | France. |
| 1,061,457 | 11/1953 | France. |
| 1,092,494 | 4/1955 | France. |
| 1,241,253 | 8/1960 | France. |
| 1,299,085 | 6/1962 | France. |
| 636,311 | 4/1950 | Great Britain. |
| 428,680 | 12/1947 | Italy. |
| 453,688 | 12/1949 | Italy. |
| 154,738 | 6/1956 | Sweden. |
| 365,959 | 1/1963 | Switzerland. |

GERALD M. FORLENZA, *Primary Examiner.*

HUGO O. SCHULZ, *Examiner.*

J. E. OLDS, *Assistant Examiner.*